United States Patent [19]

Müller et al.

[11] 4,420,994

[45] Dec. 20, 1983

[54] HYDRAULIC REGULATING DEVICE FOR LOAD OPERATED GEAR SHIFT SYSTEMS

[75] Inventors: Alfred Müller, Leonberg; Joseph Sauer, Schwieberdingen, both of Fed. Rep. of Germany

[73] Assignee: Robert Bosch GmbH, Stuttgart, Fed. Rep. of Germany

[21] Appl. No.: 199,918

[22] Filed: Oct. 23, 1980

[30] Foreign Application Priority Data

Nov. 28, 1979 [DE] Fed. Rep. of Germany ....... 2947897

[51] Int. Cl.³ ............................................. B60K 41/04
[52] U.S. Cl. .................................. 74/867; 74/752 C; 74/869; 192/3.62
[58] Field of Search ............... 74/752 C, 753, DIG. 1, 74/867, 868, 869; 192/0.076, 3.57, 3.61, 3.62

[56] References Cited

U.S. PATENT DOCUMENTS

| | | | |
|---|---|---|---|
| 3,968,707 | 7/1976 | Dach | 74/752 C X |
| 4,023,447 | 5/1977 | Sakai et al. | 74/869 |
| 4,253,553 | 3/1981 | Yamada et al. | 74/869 X |
| 4,314,488 | 2/1982 | Lauven | 74/752 C X |

FOREIGN PATENT DOCUMENTS 2658195 4/1978 Fed. Rep. of Germany .
2901051 7/1980 Fed. Rep. of Germany .

*Primary Examiner*—Leslie A. Braun
*Assistant Examiner*—Frank H. McKenzie, Jr.
*Attorney, Agent, or Firm*—Michael J. Striker

[57] ABSTRACT

The hydraulic regulating device for an automatic transmission having a selector valve for selecting a plurality of gear stages, includes a high pressure conduit, a working pressure conduit and a shift pressure conduit, a plurality of coupling elements assigned to respective gears, a single, pressure regulating valve electromagnetically controlled by a control signal to build up or decrease pressure in the shift pressure conduit, holding valves connected between the working pressure conduit and the shift pressure conduit, and shift control valves connected to the shift pressure conduit and cooperating with the holding valves to connect, in response to an increased gear, the coupling elements pertaining to the higher gear in a preselected gear stage, to the shift pressure conduit and, upon completion of the gear shift operation, to connect via the working pressure conduit the coupling elements to the high pressure conduit with the exception of the last actuated coupling element who remains connected to the shift pressure conduit.

14 Claims, 3 Drawing Figures

| GEAR | COUPLING ELEMENTS | | | | |
|---|---|---|---|---|---|
| | A | B | $C_F$ | C | D |
| P | | | | | |
| R | | O | | | O |
| N | | | | | |
| 1 | O | | | | (O) |
| 2 | O | | O | O | |
| "D"(3) | O | O | (O) | | |

FIG. 3

HYDRAULIC REGULATING DEVICE FOR LOAD OPERATED GEAR SHIFT SYSTEMS

BACKGROUND OF THE INVENTION

This invention relates generally to automatic gear changing systems and in particular to a hydraulic regulating device for load shifted gears, particularly for use in automatic transmissions for motor vehicles including a source of pressure fluid, a return conduit, a high pressure conduit connected to the source, a manually operable hydraulic selector valve for preselecting a gear stage, a working pressure conduit connected via the selector valve to the high pressure conduit, and a plurality of shift control valves assigned to respective coupling elements.

In a known hydraulic regulating device of this kind each coupling element for respective gears in the automatic transmission is provided with a damping member which ensures that the pressure in the coupling is built up according to a time function. In this manner it is attained that couplings which during the changing of the speed of the gear stage has been immediately connected to a pressure conduit by means of the assigned directional control valve, are not activated suddenly but with a gradually increasing coupling force. As a result, a soft and generally shock-free gear shift of the automatic transmission is obtained when changing the gears. At the same time a pressure dependent on the engine load is applied to the coupling dampers in order to vary the coupling force according to the load to be transmitted.

The coupling dampers have a stable characteristic line which of course due to the mass production of the dampers exhibits considerable tolerances. Since the aforementioned load dependent pressure is superposed to the time dependent damping behavior of the coupling dampers in order to achieve the aforedescribed shock-free engagement of the couplings, an exact adjustment and accurate trimming of the coupling dampers is absolutely necessary. Because in the mass production considerably large tolerance deviations may occur, it is necessary in many cases that the coupling dampers be selected according to the limits of their damping characteristic lines. In addition, the prior art coupling dampers enable the soft activation or engagement of the couplings but do not enable a controlled release or disengagement of the couplings in their connecting or sliding operation. In order to disengage the couplings the latter are directly released via directional control valves. Consequently, the pressure decrease occurs in sudden jerks and so does the coupling disengagement relation. In shifting the automatic transmission to a lower gear stage, considerable jerks are therefore unavoidable.

SUMMARY OF THE INVENTION

A general object of this invention is therefore to overcome the aforementioned disadvantages.

In particular, it is an object of the invention to provide an improved hydraulic regulating device of the aforedescribed type which enables to regulate individually the actuation of each shifting element or coupling.

Another object of this invention is to provide such an improved regulating device which provides the possibility to individually adjust by means of a pressure regulating valve the pressure built up in each shifting or coupling element in accordance with particular circumstances.

An additional object of the invention is to eliminate the conventional selection and adjustment of employed component parts.

A further object of this invention is to substantially simplify the assembly of the hydraulic regulating device.

An additional object of this invention is to provide such an improved regulating device which is less costly to manufacture.

In keeping with these objects and others which will become apparent hereafter, one feature of the invention resides, in a hydraulic regulating device having a plurality of hydraulic coupling elements, a source of pressure fluid, a return conduit, a high pressure conduit connected to the source, a manually operable hydraulic selector valve for preselecting a gear stage, a working pressure conduit connected via the selector valve to the high pressure conduit, and a plurality of shift control valves assigned to respective coupling elements, in a combination which comprises a single, pressure regulating valve connected to the working pressure conduit, a shift pressure conduit connected to the output of the pressure regulating valve, a plurality of holding valves connected between the working pressure conduit and the shift pressure conduit, the shift control valve being connected to the shift pressure conduit and cooperating with the holding valve to connect, in response to an increased gear speed in the transmission system, the coupling element pertaining to a higher gear in a preselected gear stage to the shift pressure conduit and, upon completion of the gear shifting operation, to connect via the working pressure conduit at least the last one of the actuated coupling elements to the high pressure conduit while the remaining actuated coupling elements remain connected to the working pressure conduit.

The hydraulic regulating device of this invention enables in the activation of individual coupling elements in most cases by a gradual and regulated relief of pressure in the elements. For example, in the regulating device of this invention when installed in a compound automatic transmission having three gear stages it is possible when changing gears downwardly from the third gear to the second gear to control the corresponding couplings to be disengaged both in traction and in sliding mode of operation. Also in changing the gears from the second to the first gear the coupling or shift element to be disengaged can be slidably operated to change the gears in concert with the particular condition of the engine load. The hydraulic regulating device of this invention thus makes it possible to individually influence the hydraulic engagement and disengagement of the couplings. Moreover, the regulating device can be constructed with a relatively small number of shifting and holding valves when compared to the number of couplings to be activated.

The novel features which are considered as characteristic for the invention are set forth in particular in the appended claims. The invention itself, however, both as to its construction and as to its method of operation, together with additional objects and advantages thereof, will be best understood from the following description of specific embodiments when read in connection with the accompanying drawing.

BRIEF DESCRIPTION OF THE DRAWING

FIG. 3 is a chart showing the actuation of various coupling elements in different gear stages.

DESCRIPTION OF THE PREFERRED EMBODIMENTS

Figure 1:
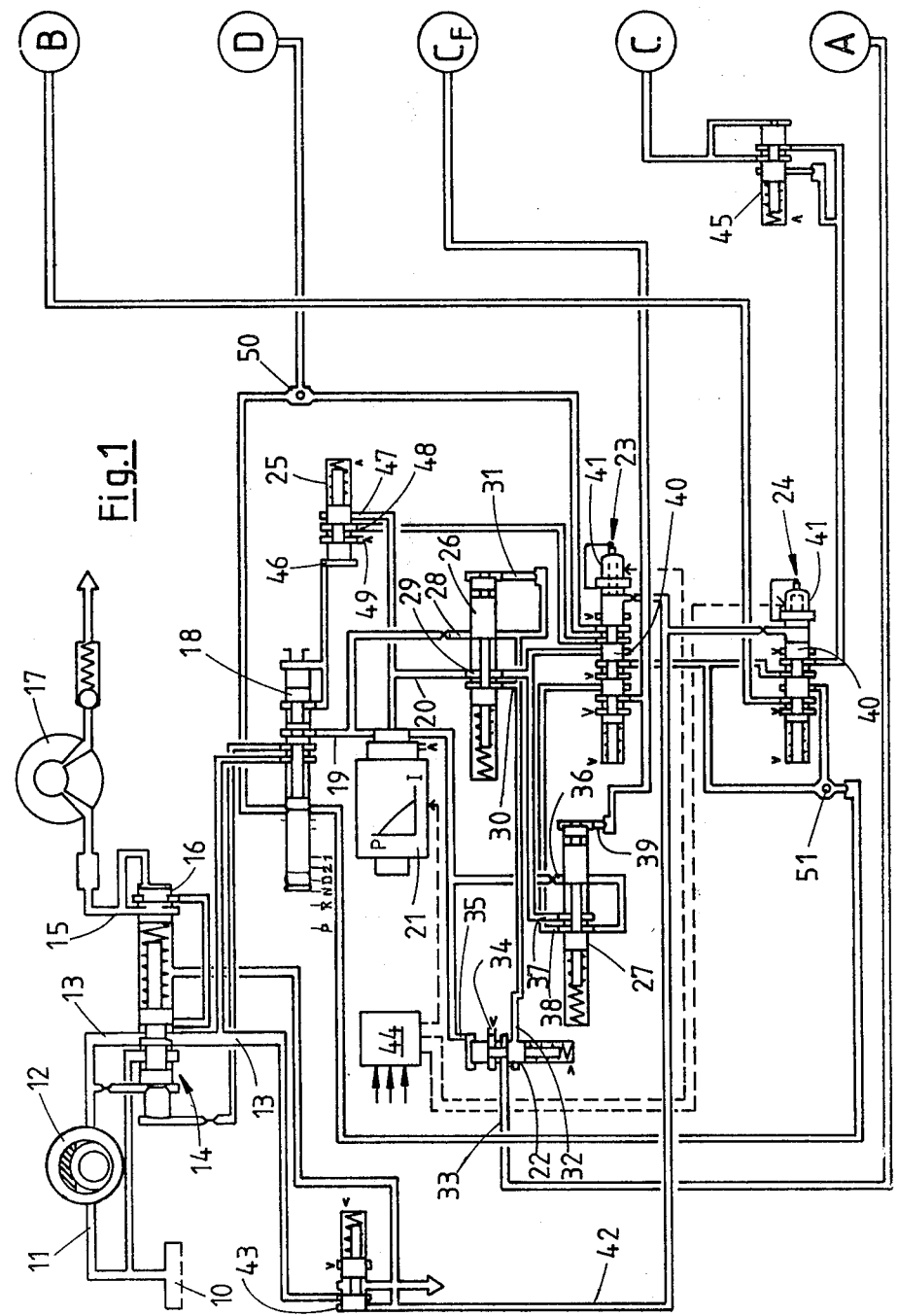
FIG. 1 is a pictorial diagram of a hydraulic circuit of the regulating device of this invention for use in a compound automatic transmission having five coupling elements.

The hydraulic regulating device illustrated in FIG. 1 is applicable for a compound engine load operated automatic transmission having altogether five shifting or coupling elements A, B, $C_F$, C and D which in accordance with respective gear stages and required gear speeds are consecutively operated in different combinations, that means they are consecutively engaged or disengaged. In order to operate these couplings A through D, the hydraulic regulating device of this invention includes a source of pressure fluid 10 in the form of a reservoir from which a suction conduit 11 delivers by means of a pump 12 pressure fluid into a main pressure conduit 13. Pressure in the main pressure conduit 13 is controlled by means of a main pressure valve 14 in dependence on the engine load. From the main pressure valve 14 a supply conduit 15 feeds pressure fluid via pressure regulating valve 16 to a hydrodynamic torque converter 17 from which the pressure fluid is supplied to a non-illustrated lubricating system of the transmission. The construction and the operation of the aforedescribed parts of the hydraulic regulating device are known from prior art, disclosed for example in the German Pat. No. 2 658 195 and need not be discussed in detail.

A manually operable hydraulic selector valve 18 is connected to the main pressure conduit 13 to preselect different gear stages. As known, the selector valve 18 preselects the position P, R, N, D, 2 and 1 (FIG. 1) corresponding to respective gear stages of the automatic transmission. P denotes parking, R is reverse gear, N is neutral position, D is driving position in which the transmission automatically changes over to different gear speeds, 2 denotes lower gear stage in which the third gear is blocked, and 1 denotes the lower gear in which the second and third gears are blocked.

In the D, 2 and 1 positions of the selector valve 18 a working pressure conduit 19 is connected to the main pressure conduit 13. Fluid pressure in the working conduit 19 is therefore the same as the pressure in the main conduit 13. An electromagnetically activated pressure regulating valve 21 is connected at its input to the working pressure conduit 19 to regulate the pressure build-up and the pressure decrease in the shift pressure conduit 20 connected to the output of the valve 21. The pressure regulating valve of this type is described in the German published patent application No. 2 901 051. In contrast to the valve described in this application, the present pressure regulating valve has an inversely proportional characteristic of its output pressure relative to the excitation electrical current, that means fluid pressure generated by the regulating valve 21 in the shift pressure conduit 20 is inversely proportional to the applied excitation electrical current. If, a low excitation current is supplied to the regulating valve 21, fluid pressure in the shift pressure conduit 20 has a big predetermined value. With increasing excitation current the fluid pressure in the conduit 20 continually decreases and finally achieves zero when a predetermined value of the excitation current is attained. The characteristic curve of P-I is schematically indicated in the block diagram of the valve 21 in FIG. 1.

In order to activate respective couplings A through D, shift control valves 22–25 and holding valves 26 and 27 are connected to the working pressure conduit 19, to the shift pressure conduit 20 and to the individual couplings A through D in such a manner that in each preselected gear stage ("D" or "2" selector position of the selector valve 18) when the gear speed is to be increased, the corresponding shift elements or couplings A, B and C and $C_F$ to be activated are connected to the shift pressure conduit 20 and upon completion of the gear shift the activated couplings with the exception of the last activated couplings C and B are connected to the working pressurre conduit 19 leading to the main pressure conduit whereas the last activated couplings C or B remain connected to the shift pressure conduits 20. Whereas the connection of the couplings A, B, C and $C_F$ to the shift pressure conduit 20 takes place via the shift valve 22–24, the connection of the coupling A and $C_F$ to the working pressure conduit 19 is effected by the holding valves 26 and 27. Only these two couplings A and $C_F$ which are operable in more than one gear stage are equipped with the holding valves 26 and 27.

In the drive gear stage, that means when the selector valve 18 is moved to its "D" position, the coupling A is activated in the lowest (first) gear speed. In the second gear, couplings A, C and $C_F$ are activated or engaged. In the third gear speed, the coupling C is again released and the coupling B additionally activated so that altogether the couplings A, $C_F$ and B are engaged. The holding valve 26 or 27 is therefore assigned always to the couplings A and $C_F$. The holding valves 26 and 27 are formed as hydraulically controlled, 3-way, 2-position directional control valves provided with resetting springs. In the holding valve 26, the first working port 28 is connected to the working pressure conduit 19, the second working port 29 is connected to the shift pressure conduit 20 and the third working port 30 and the control port 31 are connected via an assigned directional control valve 22 to the coupling A.

The directional control valve 22 which is designed as a hydraulically controlled, 3-way, 2-position directional control valve having a resetting spring, shuts in its rest position the connection between the holding valve 26 and the coupling A whereas in its working position the latter connection is open. For this purpose the first working port 32 of the control valve 22 is connected to the first working port 30 or to the control port 31 of the holding valve 26, the second working port 33 is connected to the coupling A and the third working port 34 is pressure relieved. The control port 35 of the directional control valve 22 is immediately connected to the working pressure conduit 19. The second holding valve 27 assigned to the coupling $C_F$ has its first control port 36 connected to the working pressure conduit 19, its second control port 37 is connected to the shift pressure conduit 20, and the third control port 38 is connected via the assigned shift valve 23 to the coupling $C_F$ and its control port 39 is directly connected to the coupling $C_F$. The resetting force of the spring in both holding valves 26 and 27 is dimensioned such as to permit the position switchover only at a predetermined pressure level in either control ports 31 and 39. By this means it is ensured that the position switchover of the holding valves 26 and 27 takes place only at the end of the shifting process, namely after the assigned couplings have been activated. Consequently, the assigned shift valves 22 and 23 during the activation of the couplings via the holding valve 26 and 27 are connected due to the rest position of the latter valve to the shift pressure conduit 20.

One of the shift valves 22–25 is assigned to each gear in the forward gear stage. Coupling A is operated by shift valve 22, the couplings C and $C_F$ by the valve 23, and the coupling D is operated via the valve 24. As far as the shift valve 25 for the coupling D is concerned, it is activated via the shift valve 25 in the gear stage "1" (first position of the selector valve 18) as will be explained below.

The two shift valves 23 and 24 for the second gear and for the third gear are constructed in the form of electromagnetically controlled directional control valves. The electromagnetic control of these valves can be effected immediately, that means that the two valves 23 and 24 are constructed as solenoid operated control valves. In this example the shift valves 23 and 24 are formed by a hydraulically operated sliding-spool valve 40 and a 2-way, 2-position solenoid operated valve 41. In this case the valves 23 and 24 are additionally connected to a control pressure conduit 42 which is connected via a pressure reducing valve 43 to the main pressure conduit 13. When the shift valves 23 and 24 are constructed as solenoid operated valves, the control pressure conduit 42 with its pressure reducing valve 43 can of course be dispensed with. The electromagnetic actuation of the shift valves 23 and 24 as well as the electromagnetic control of the pressure regulating valve 21 is made by an electronic control apparatus 44 to which all regulating information such as engine load, speed of the motor vehicle, or the rotary speed of the driving shaft and the position of the selector valve 18 are applied in the form of signals from corresponding feelers. The electromagnetically controlled shift valve 23 connects in its working position the coupling $C_F$ of the second gear stage immediately to the shift pressure conduit 20 and also connects to the conduit 20 the coupling C of the same gear stage via the second shift valve 24 which is in its rest position. In the rest position of the shift valve 23 the connection between the shift pressure conduit 20 and the couplings C and $C_F$ is interrupted. As mentioned above, the connection between the coupling $C_F$ and the shift pressure conduit 20 is established via the holding valve 27. In the working position of the holding valve attained at the end of the coupling engaging process, the connection between the shift pressure conduit 20 and the coupling $C_F$ is interrupted and a connection between the working pressure conduit 19 and the coupling $C_F$ is established so that the latter coupling $C_F$ is immediately attacked by the main pressure. A delaying valve 45 is connected in series with the coupling C in order to produce a delayed activation of the coupling C in response to instant operational conditions during the activation of the valve 23; the delaying valve 45 can be constituted by a parallel connection 52 of another return valve and a restrictor connected to a 3-way, 2-position directional control valve 53 having a resetting spring.

The other electromagnetically controlled shift valve 24 interrupts in its working position the connection between the coupling C and the assigned shift valve 23 and at the same time connects the coupling B to the shift pressure conduit 20. The latter connection is made via the shift valve 23 which is in its working position in which the connection between the shift valve 24 and the shift pressure conduit 20 takes place. To realize the above-described shifting conditions the sliding-spool directional control valve 40 of the shift valve 24 is constructed as a 6-way, 2-position directional control valve; the corresponding sliding spool control valve 40' of the shift valve 23 is constructed as a 9-way, 2-position directional control valve.

The operation of the hydraulic regulating device, in the D-position of the selector valve 18 in which the "drive" gear stage of the automatic transmission is preset, is as follows:

In this D-position of the selector valve 18, the main pressure conduit 13 is immediately connected to the working pressure conduit 19 so that the main pressure is established in the latter conduit. This main or high pressure in the conduit 19 displaces the valving element of the valve 22 assigned to the coupling A thus connecting the latter coupling to the conduit 20. Thereupon the pressure regulating valve 21 is actuated by the electronic control apparatus 44 to build up pressure in the conduit 20 until the coupling A is activated or engaged. At the same time, control port 31 of the holding valve 26 is attacked by pressure in the fluid pressure conduit 20 and the sliding spool of the valve 26 is slowly moved into its switching position in which the connection between the coupling A and the shift pressure conduit is maintained and only at the end of the movement of the sliding spool of the valve 26 when the coupling A is fully engaged, this connection is interrupted. The size of the recessed part of the sliding spool of the valve 26 for achieving this delayed switching action is clearly depicted in the pictorial diagram of the valve 26 in FIG. 1. As soon as the holding valve 26 has attained its working position, the coupling A is now exposed via the shift valve 22 to the stable high pressure in the working pressure conduit 19 and the pressure in the shift pressure conduit 20 can be again reduced to zero without influencing the coupling condition of the coupling A.

When changing the transmission into the "2" stage, the electronic control apparatus 44 energizes the shift valve 23 which is promptly moved into its working position. In this working position the coupling $C_F$ is directly connected to the shift pressure conduit 20 and the coupling C is connected to the conduit 20 via the series connected delay valve 45 and the shift valve 24 which at this instant is in its rest position. The pressure regulating valve 21 is again controlled by the electronic control apparatus 44 to build up pressure in the couplings $C_F$ and C in response to a nominal value detected by the sensors. As mentioned before, the actuation process of the coupling C is delayed due to the series connected delay valve 45 with respect to the actuation process of the coupling $C_F$. The gradually increasing pressure in the shift pressure conduit 20 is applied also the control port 39 of the holding valve 27. In the same manner as described above in connection with the holding valve 26, the holding valve 27 controls at the end of the actuation process of the coupling $C_F$ the direct connection of the latter coupling to the stable working pressure in the conduit 19 so that also the coupling $C_F$ be subject to the main pressure. Coupling C remains connected to the shift pressure conduit 20 via the two shift valves 24 and 23 even after the completion of its activation or engagement. The required pressure in the shift pressure conduit 20 is generated by the pressure regulating valve 21.

In shifting to the next higher gear speed ("third gear") the pressure regulating valve 21 is again controlled by the electronic apparatus 44 to decrease pressure in the shift pressure conduit 20 to zero. In doing so, coupling C is pressure relieved in a regulated manner and the delay valve 45 is ineffective. As soon as pressure in the shift pressure conduit 20 attains the zero value, the electronic control apparatus 44 energizes the shift valve 24 and moves the same from its rest position illustrated in FIGS. 1 and 2 into its working position. The shift valve 23 remains in its previously adjusted working position. As a result, the coupling B is connected via the two shift valves 23 and 24 to the shift pressure conduit 20. The pressure build-up in the conduit 20 is again regulated by the pressure regulating valve 21 which thus engages the coupling B in a controlled manner. Upon the completion of the engaging process of the coupling B, the latter remains connected to the shift pressure conduit 20.

If the automatic transmission has to change from the third gear into the second gear, the pressure regulating valve 21 starts reducing pressure in the conduit 20 toward zero and the coupling B can be individually and in a controlled manner disengaged. As soon as the shift pressure conduit 20 is pressure relieved, the shift valve 24 is deenergized. By the action of its return spring it is returned into its rest position shown in FIGS. 1 and 2 and the coupling B is disconnected from the shift pressure conduit 20 and the coupling C is connected to the conduit 20. A renewed pressure build-up in the shift pressure conduit 20 by means of the pressure regulating valve 21 results in a new activation of the coupling C.

Figure 2:
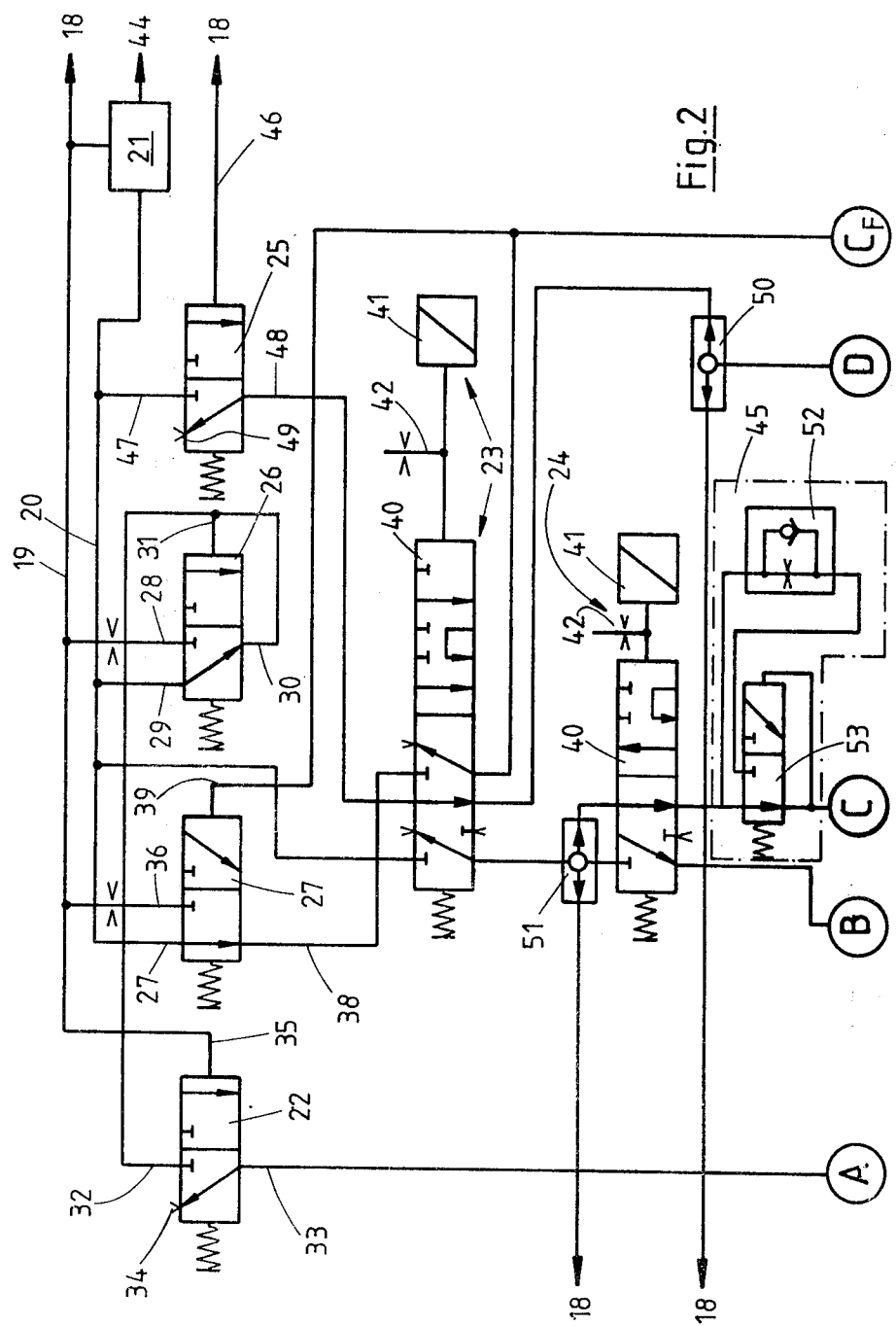
FIG. 2 is a schematic circuit diagram of a part of the circuit of FIG. 1 illustrating shifting and holding valves for respective holding elements.

When returning the shift to the lowest gear stage "1", the coupling C due to the controlled pressure decrease in the shift pressure conduit 20 is inactivated in a controlled manner. After the deenergization of the shift valve 23 and its return into its rest position, the coupling $C_F$ is immediately connected to the return conduit. All return conduits in FIG. 2 are indicated by arrowheads V. The $C_F$ therefore is inactivated without any regulation. This effect however does not produce any impairment of the shifting operation inasmuch as in shifting from the second to the first gear the motor vehicle is almost motionless.

It can be seen from the aforedescribed operation of the hydraulic regulating device of this invention that it is possible to engage all couplings in a regulated manner. For all practical purposes, it is also possible to disengage the individual couplings, namely in the case of shifting down from the third gear to the second gear the coupling B is in pull-and-shift operation and in the case of shifting down from the second gear to the first gear the coupling C is in shift operation.

As mentioned before, the "1" position of the selector valve 18 for the low gear forward stage of the automatic transmission there is no automatic shift to the second gear or to the third gear as is the case in the other forward gear stages of the selector valve 18. In this "1" gear stage of the selector valve 18, the working pressure conduit 19 is also connected to the main pressure conduit 13 and moreover the control port 46 of the shift valve 25 is also connected to the main pressure conduit 13. The shift valve 25 is constructed as a hydraulically operated 3-way, 2-position directional control valve provided with a resetting spring. The first working portion 47 of the valve 25 is connected to the shift pressure conduit 20, the second working port 44 is connected via the shift valve 23, which is in its rest position, to the coupling D, and the third working port 49 is pressure relieved, that means it is connected to the return conduit leading into the pressure fluid source 10. In the rest position of the shift valve 25 and in the rest position of the shift valve 23, the coupling D is connected to the return conduit via these two valves.

As soon as in the "1" stage or position of the selector valve 18 the control port 46 of the valve 25 is connected to the main pressure conduit 13, the shift valve 25 moves from its rest position into its working position. As a result, the coupling D is connected by the two shift valves 23 and 25 to the shift pressure conduit 20. The pressure regulating valve 21 starts controlling the pressure build-up in the shift pressure conduit 20 from zero pressure level to a predetermined activation pressure level. During the pressure build-up the coupling D is activated or engaged in a controlled manner. Upon the completion of the engagement program of the coupling, the latter remains connected to the shift pressure conduit 20. In the same manner as described before, the coupling A also is activated or engaged. In the stage "1" with the limited gear speeds, both couplings A and D are engaged while the two electromagnetically controlled shift valves 23 and 24 remain unactuated. The latter valves remain in their rest positions illustrated in FIGS. 1 and 2.

In their "2" gear stage position of the selector valve 18, a low gear forward stage is preliminarily selected in which only the third gear is blocked in the automatic transmission. In this "2" position of the selector valve 18 the hydraulic conditions are the same as those described in connection with "D" position of the selector 18. In the lowest gear speed the coupling A is activated to engage the first gear. In changing to the next higher gear speed, the second gear, the couplings C and $C_F$ are connected to the shift pressure conduit 20 in the same manner as described in connection with the operation of the "drive" gear stage and the latter couplings are activated in a controlled or regulated manner by the increasing pressure in the shift pressure conduit 20. In this "2" gear stage, the shift valve 24 is not actuated.

The "R" position of the selector valve 18 corresponds to the reverse gear. In this "R" position the working pressure conduit 19 is disconnected from the main pressure conduit 13 and together with the shift pressure conduit 20 remains without any pressure. The coupling D is connected immediately to the main pressure conduit 13. The coupling D is connected to a changeover valve 50 called a logic valve. This changeover valve 50 has only two flow path directions so that pressure fluid can pass only from the main pressure conduit 13 to the coupling B and vice versa and from the shift pressure conduit 20 to the coupling D and vice versa, whereby no direct connection is established between the main pressure conduit 13 and the shift pressure conduit 20, and consequently no bypassing of the coupling D can take place. In addition, in the "R" position of the selector slider 18, the coupling B is immediately connected via the shift valve 24 to the main pressure conduit 13 whereby the shift valve 24 is energized by the electronic control apparatus 44 and assumes its working position. In order to prevent flow of the pressure fluid in the remaining shifting and holding valves, the shift valve 24 is also provided with a series connected changeover valve 51. In the reverse gear this changeover valve 51 permits the flow of pressure fluid from the main pressure conduit 13 in the direction of coupling B whereas in the "D" (drive) position the pressure fluid from the shift pressure conduit 20 flows also in the direction of the coupling B and can pass through the changeover valve 51. A direct connection between the main pressure conduit 13 and the shift pressure conduit 20 is therefore in all gear stages effectively prevented. In the "R" (reverse gear) position of the selector valve 18, the couplings B and D are activated or engaged.

It will be understood that each of the elements described above, or two or more together, may also find a useful application in other types of constructions differing from the types described above.

While the invention has been illustrated and described as embodied in a specific example of a hydraulic regulating device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic regulating device for a load operated gear shift system, particularly for an automatic transmission in motor vehicles including a plurality of hydraulic coupling elements, a source of pressure fluid, a return conduit, a high pressure conduit connected to the source, a manually operable hydraulic selector valve for preselecting a gear stage, a working pressure conduit connected via the selector valve to the high pressure conduit, and a plurality of shift control valves assigned to respective coupling elements, the device comprising a single pressure regulating valve having an input and an output; said working pressure conduit being connected to the input of said pressure regulating valve; a shift pressure conduit connected to the output of the pressure regulating valve; a plurality of holding valves connected between said working pressure conduit and said shift pressure conduit; said shift control valves being connected to said shift pressure conduit and cooperating with said holding valves to connect, in response to an increased gear speed in the preselected gear stage the coupling elements pertaining to a higher gear in the preselected gear stage to said shift pressure conduit and after the gear shift operation is completed, to connect via said working pressure conduit the latter coupling elements with the exception of the last connected coupling element, to said high pressure conduit while the last connected coupling element remains connected to said shift pressure conduit.

2. A hydraulic regulating device as defined in claim 1 wherein said holding valves are assigned to those couplings which are activated in more than one gear speed to connect those couplings to the shift pressure conduit and the working conduit.

3. A hydraulic control device as defined in claim 2 wherein said holding valves are in the form of hydraulically controlled 3-way, 2-position directional control valves having resetting springs, a first working port connected to the working pressure conduit, a second working port connected to the shift pressure conduit, a third working port connected via a shift valve to the corresponding coupling element operable in more than one gear speed, and a control port connectable to the latter coupling element.

4. A hydraulic control device as defined in claim 3 wherein said resetting spring of each holding valve is designed such as to actuate respective holding valves only after a predetermined pressure level is built up on the control port.

5. A hydraulic regulating device as defined in claim 4 wherein said holding valves are operable between a rest position and a working position, and the coupling elements cooperating with said holding valves are connected, in the rest position of said holding valves, via the corresponding shift valves to the shift pressure conduit and, in the working position of said holding valves, to said working pressure conduit and to said high pressure conduit.

6. A hydraulic regulating device as defined in claim 5 wherein a shift valve is provided for each gear in respective gear stages.

7. A hydraulic regulating device as defined in claim 6 wherein the shift valve for the first gear is in the form of a hydraulically controlled, 3-way, 2-position directional control valve having a resetting spring, a control port connected to the working pressure conduit, a first working port connected to the assigned holding valve and a second working port connected to the assigned coupling element for the first gear.

8. A hydraulic regulating device as defined in claim 7 wherein the coupling elements assigned to higher gears cooperate with shift control valves in the form of solenoid controlled directional control valves.

9. A hydraulic regulating device as defined in claim 8 wherein said solenoid controlled directional control valves include a hydraulically controlled sliding spool valve and a 2-way, 2-position solenoid controlled valve coupled to said sliding spool valve.

10. A hydraulic regulating device as defined in claim 8 comprising a first electromagnetically controlled two-position directional control valve which, in its working position, connects a coupling elements assigned to a higher gear directly to the shift pressure conduit and further connects another coupling element assigned to the same higher gear via a second electromagnetically controlled two-position directional control valve and in the rest position of the first-mentioned electromagnetically controlled directional control valve, said two coupling elements are disconnected from said shift pressure conduit, and in the working position of one of said holding valves assigned to the first of the two coupling elements the connection between said one coupling element and said shift pressure conduit is interrupted and a connection to the working pressure conduit is established.

11. A hydraulic regulating device as defined in claim 10 wherein a delay valve is connected to the second of the two coupling elements assigned to the higher gear.

12. A hydraulic regulating device as defined in claim 11 wherein in the working position of the second electromagnetically controlled directional control valve the connection between the second coupling element assigned to the higher gear and the shift pressure conduit is interrupted and a coupling element assigned to a subsequent higher gear is connected to the shift pressure conduit.

13. A hydraulic regulating device as defined in claim 12 further including a changeover valve connected in series with the second electromagnetically controlled directional control valve between the connection of said coupling element assigned to said next higher gear, said changeover valve connecting the latter coupling element via said selector valve to said high pressure conduit.

14. A hydraulic regulating device as defined in claim 1 wherein said pressure regulating valve is electromagnetically controlled inversely to the applied electrical control current.

* * * * *